United States Patent Office 3,655,816
Patented Apr. 11, 1972

3,655,816
PHOSPHORUS ACID-DIESTERS AND EPOXY RESIN SYSTEMS CONTAINING THE SAME
Hans Joachim Lorenz, Bensheim-Auerbach, and Hans-Jurgen Sander, Lorsch, Hessen, Germany, assignors to Deutsche Advance Produktion GmbH
No Drawing. Filed Dec. 24, 1969, Ser. No. 888,034
Int. Cl. C08g 45/06, 30/14
U.S. Cl. 260—830 R
4 Claims

ABSTRACT OF THE DISCLOSURE

An epoxy resin system of conventional composition with hardening agents and possibly further customary additives, containing also as hardening accelerator from 0.1 to 150, and preferably from 5 to 20, parts by weight of a phosphorous acid-diester of the general formula:

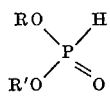

in which R and R' can be the same or different and signify straight chain alkyl containing from 1 to 14 carbon atoms, branched alkyl containing from 3 to 14 carbon atoms, straight chain alkoxyalkyl having 2 to 14 carbon atoms, branched alkoxyalkyl having 3 to 14 carbon atoms, alkenyl and substituted alkenyl, aryl, and aralkyl and alkaryl wherein the alkyl portions contain from 1 to 9 carbon atoms, and at least one of the substituents R and R' contains at least one chlorine and/or bromine atom, per 100 parts by weight of epoxy resin, and a phosphorous acid-diester of the same general formula wherein R and R' are different.

---

The present invention relates to epoxy resin systems of conventional composition as used for the production of molded articles, for the formation of coatings, as adhesives and as binders. More particular, the present invention relates to epoxy resin systems containing novel hardening accelerators and to the acelerators thus employed.

Epoxy resin systems for the above purposes customarily contain besides the epoxy resin or mixture of various epoxy resins, hardening agents or mixtures of several hardening agents, and possibly further additive substances such as fillers or extenders. The term "epoxy resin" herein is intended to define compounds containing more than one 1,2-epoxy group

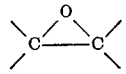

per molecule, such as those disclosed in H. Lee and Kr. Neville, Handbook of Epoxy Resins, McGraw-Hill Book Co., 1967, especially at pages 1 and 2 and Modern Plastics Encyclopedia for 1962, pages 186–192, and 197 and for 1964, pages 173–177, published by Modern Plastics, New York, N.Y. These disclosures are incorporated herein by reference. This invention is applicable to any epoxy resin system containing compounds having two or more epoxy groups to the molecule. As hardening substances for "cold hardening" at ambient temperature there can be used, for example, amines of varying structure, polyamino amides or melamine resins; for "heat hardening" there may be used, for example, anhydrides of organic or inorganic acids as well as phenol resins or isocyanates. The hardening is based on the reaction between the hardening agent and the epoxy groups of the resin. The time required for the hardening reaction depends especially upon the type of hardener used and the hardening conditions applied and may vary widely.

When the mixture of epoxy resin-hardening agent contains as further components still additional additive substances such as, for example, certain varieties of tar, mineral substances, pigment dyes, extenders, for example a refined mineral oil, or if it is used for the production of laminated materials with the use of glass, mica or asbestos, or for the coating of paper or metals, etc., then a delay of the hardening occurs as compared to the nonfilled resin-hardening agent system. A large number of additive substances has already been proposed in order to accelerate the hardening of such filled as well as nonfilled resin-hardening agent substances or in order to lower the hardening temperature. These previously known hardening accelerators can be divided into two groups: bases and organic or inorganic acids, the latter possibly in the form of their salts.

Examples of bases previously used as hardening accelerators include trialkylamines, triphenylphosphite and tricyclohexylphosphine (U.S. Pat. No. 2,768,153). The trialkylamines and tricyclohexylphosphine are relatively difficultly accessible and thus expensive compounds, and the triphenylphosphite has only a relatively low effectiveness. Examples of acids previously used for this purpose include all acid phosphorous compounds containing the group =P(O)(OH)—, such as phosphorous acid, phosphoric acid, phosphonic acid, phosphinic acid, phosphoric acid monoesters, phosphoric acid diesters and mixed phosphoric acid mono and diesters. Disadvantages of these acid hardening accelerators include the fact that they cannot be stored together with the epoxy resin component since they react even in the absence of the actual hardener during storage with the epoxy groups of the resin, which results in an undesirable increase in viscosity of the resin mixture.

It has now been found that the above disadvantages connected with the previously known hardening accelerators for epoxy resin can be circumvented and the results achieved during hardening can at the same time be considerably improved when phosphorous acid-diesters are added to the epoxy resins as hardening accelerators. The fact that the essentially neutrally reacting phosphorous acid-diesters represent extremely effective hardening accelerators is completely surprising in view of the fact that the previously known hardening accelerators are decidedly basic or acid reacting compounds.

Thus, the present invention relates to an epoxy resin system of conventional composition with hardening agents and possibly further customary additives, containing also as hardening accelerator from 0.1 to 150, and preferably from 5 to 20 parts by weight of a phosphorous acid-diester of the general formula

 (I)

in which R and R' can be the same or different and signify straight chain alkyl containing from 1 to 14 carbon atoms, branched alkyl of 3 to 14 carbon atoms, straight chain alkoxy-alkyl having 2 to 14 carbon atoms, e.g., methoxymethyl, ethoxyethyl and the like, branched alkoxyalkyl having 3 to 14 carbon atoms, alkenyl and substituted alkenyl, e.g., vinyl, allyl, decenyl and the like, aralkyl wherein the alkyl portion contains 1 to 9 carbon atoms, e.g., benzyl and the like, aryl, e.g., phenyl, naphthyl and the like and alkaryl wherein the alkyl portion contains 1 to 9 carbon atoms, e.g., tolyl, xylyl, p-nonylphenyl and the like, and at least one of the substituents R and R' contains at least one chlorine and/or bromine atom, per 100 parts by weight of epoxy resin. In the foregoing definition, there is no practical limitation upon the number of carb-- atoms in the alkenyl or aryl groups or in the aryl portions of the aralkyl and alkaryl groups. Preferably, however, the alkenyl will contain 2 to 14 carbon atoms and the aryl groups and aryl portions of the aralkyl and alkaryl groups will contain 6 to 14 carbon atoms. The substituted alkenyls include alkenyloxyalkyl, alkyloxyalkenyl and alkenoxyalkenyl. The hardening acceleration does not occur in the substituents R and R' (such as for example with diethylphosphite) in the absence of halogen. The hardening accelerators of the present invention may be added to the epoxy resin either before or after the addition of the hardener.

The phosphorous acid-diesters excel not only through an improved accelerating effect as compared with previously known hardening accelerators but they moreover bring about a decrease in the viscosity of the epoxy resin and thus of the entire system. As a result, the workability of the resin in unfilled systems is improved. In filled systems this lowering of the viscosity makes possible the utilization of larger quantities of filler. As a further effect, an improved hardening has been observed which can lead to a decrease in brittleness, particularly in the case of filled substances. The end products obtained show no surface stickiness, as is the case frequently when using as accelerator, for example, polyamino amides, and they are therefore well hardened and show an improved brightening of color. This has the effect that unfilled systems, which usually result in brown up to honey yellow transparent end products, become bright yellow to transparent and in the case of filled systems the often observed change in color from weathering does not occur.

The invention is explained in more detail in the following examples but is not to be considered as limited to them.

EXAMPLE 1

The hardening time of a system hardening at room temperature consisting of 50 grams epoxy resin, having the general formula:

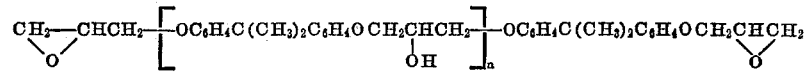

wherein $n$ is of such value that the epoxy equivalent weight is about 190, and 16 grams of a cycloaliphatic polyamine (Laromin C 252 of Badische Anilin- u. Soda-Fabrik A.G.), H active equivalent weight 52, as a hardener was, without the addition of hardening accelerator (control experiment), 110 minutes. When 5 grams each of the following phosphorous acid-diesters and prior art accelerators were added, the hardening times were as indicated in the following Table I.

TABLE I

| Accelerator: | Hardening time (min.) |
|---|---|
| β-Chloroethyl-ethyl phosphite | 45 |
| Bis-β-chloroethyl phosphite | 52 |
| Bis-β-chloroisopropyl phosphite | 54 |
| Bis-β,β'-dichloroisopropyl phosphite | 42 |
| Bis-β-bromo-β'-chloroisopropyl phosphite | 11 |
| Allyl-β-chloroethyl phosphite | 50 |
| Phenyl-β-chloroethyl phosphite | 35 |
| p-Nonylphenyl-β-bromoethyl phosphite | 32 |
| o-Tolyl-β-bromoethyl phosphite | 43 |
| Methyl-β-chloroethyl phosphite | 20 |
| Bis-β-chloroethyl-α-dodecyl phosphite | 86 |
| Bis-β-chloroethyl-α-butyl phosphite | 63 |
| Bis-γ-chloropropyl phosphite | 43 |
| Bis-β-chloro-β'-dodecyloxyisopropyl phosphite | 78 |
| Tricyclohexylphosphine (prior art) | 107 |
| Diethylphosphite (prior art) | 103 |

EXAMPLE 2

A mixture consisting of 50 grams of the epoxy resin of Example 1 and 16 grams of the polyamine hardener of Example 1 was mixed with varying amounts of bis-β-bromo-β'-chloroisopropyl phosphite as accelerator. The resultant hardening times on minutes are shown in Table II.

TABLE II

| Amounts of accelator (grams): | Hardening time (min.) |
|---|---|
| 0 | 110 |
| 0.25 | 80 |
| 0.5 | 60 |
| 5 | 11 |
| 10 | 4 |

EXAMPLE 3

A mixture consisting of 50 grams of the epoxy resin of Example 1 and 16 grams of the polyamine hardener of Example 1 was mixed with varying amounts of bis-β,β'-dichloroisopropylphosphite as accelerator. The resultant hardening times and the viscosities of the mixtures are shown in Table III.

TABLE III

| Amounts of accelerator (grams) | Hardening time (minutes) | Viscosity (centipoises) |
|---|---|---|
| 0 | 110 | 34,800 |
| 5 | 42 | 20,700 |
| 10 | 28 | 18,600 |
| 25 | 14 | 7,400 |
| 50 | 21 | 3,930 |
| 75 | 35 | 3,410 |

EXAMPLE 4

The hardening times at room temperature of a system consisting of 50 grams of the epoxy resin of Example 1, 22.5 grams of a polyamino amide (Merginamid L 400 of Harburger Fettchemei) having an H active equivalent weight of approximately 95 as a hardening agent, and containing 5 grams of an accelerator of the present invention are shown in Table IV.

TABLE IV

| Accelerator: | Hardening time (min.) |
|---|---|
| None | 125 |
| β-Chloroethyl-ethyl phosphite | 75 |
| Bis-β-chloroethyl phosphite | 70 |
| Bis-β-bromo-β-chloorisopropyl phosphite | 15 |

EXAMPLE 5

The hardening times at various temperatures of a system consisting of 50 grams of the epoxy resin of Example 1, 32.5 grams phthalic acid anhydride as a hardening agent and containing 5 grams of accelerators of the present invention and of the prior art are shown in Table V.

TABLE V

| Temperature (° C.) | Accelerator | Time (hrs.) |
|---|---|---|
| 150 | None | 8.5 |
| 150 | β-Chloroethyl-ethyl phosphite | 3 |
| 120 | None | 18.5 |
| 120 | Chloroethyl-ethyl phosphite | 8.5 |
| 150 | Triphenyl phosphite (prior art) | 8 |

EXAMPLE 6

The hardening times at 160° C. of a system consitsing of 50 grams of the epoxy resin of Example 1, 40 grams of hexahydrophthalic acid anhydride as a hardening agent, and containing 5 grams of accelerators of the present invention and of the prior art are shown in Table VI.

TABLE VI

| Accelerator: | Hardening time, hrs. |
|---|---|
| None | 12 |
| β-Chloroethyl-ethyl phosphite | 5.5 |
| Triphenylphosphite (prior art) | 12 |

EXAMPLE 7

The hardening times at various temperatures of a filled epoxy resin system consisting of 100 grams cycloaliphatic diepoxy resin, epoxy equivalent weight of about 175 (Lekutherm X 100 of Farbenfabriken A.G.), 42 grams cycloaliphatic diamine (Laromin C 260 of Badische Anilin- u. Soda-Fabrik A.G.) H active equivalent weight of about 60, and 250 grams quartz powder and containing an accelerator of the present invention are shown in Table VII.

TABLE VII

| Temperature (° C.) | Accelerator (grams) | Time (min.) |
|---|---|---|
| 60 | None | 92 |
| 60 | β-Chloroethyl-ethyl phosphite (20) | 54 |
| 40 | None | 180 |
| 40 | β-Chloroethyl-ethyl phosphite (20) | 55 |
| 40 | β-Chloroethyl-ethyl phosphite (30) | 49.5 |
| 40 | Bis-β,β'-dichloroisopropyl phosphite (20) | 34 |
| 40 | Bis-β,β'-dichloroisopropyl phosphite (30) | 41 |

EXAMPLE 8

A mixture of 100 grams cycloaliphatic diepoxy resin, epoxy equivalent weight of 157 (Araldit CY 175 of Ciba) and 51.1 grams of hexahydrophthalic acid anhydride was gelled at a hardening temperature of 120° C. after three hours and was solid after 5 hours. When 10 grams bis-β-chloroethyl phosphite was added, the mixture gelled after 2¼ hours and was solid after 3½ hours. When 10 grams bis-β,β'-dichloroisopropyl phosphite was added, the mixture gelled after 2¼ hours and was solid after 3½ hours.

EXAMPLE 9

The hardening times at varying temperatures of a hot hardening clear lacquer consisting of 15 grams methyl ethyl ketone, 10 grams pine oil, 25 grams ethanol, 40 grams toluene, 60 grams of an epoxy resin having the formula given in Example 1 wherein $n$ is of such value that the epoxy equivalent weight of 2000–2500 (Epon 1007), 7 grams of an epoxy resin having the formula given in example wherein $n$ is of such value that the epoxy equivalent weight of 2500–4000 (Epon 1009) and 33 grams of a nonplasticized urea-formaldehyde resin (Resamin 155 F of Chemische Werke Albert) and containing varying amounts of bis-β-chloroethyl phosphite as accelerator are shown in Table VIII.

TABLE VIII

| Temperature (° C.) | Accelerator (grams) | Time (min.) |
|---|---|---|
| 180 | None | 30 |
| 180 | 5 | 5 |
| 180 | 15 | 1.5 |
| 120 | None | 4.5 |
| 120 | 5 | 2.5 |

The advantages of the present invention can be obtained in any epoxy resin system containing epoxy compounds having two or more epoxy groups per molecule including butadiene dioxide, dicyclopentadiene dioxide, vinylcyclohexene dioxide, 3,4 - epoxy - 6 - methylcyclohexylmethyl - 3,4 - epoxy - 6 - methylcyclohexanecarboxylate, divinylbenzene dioxide, bis(2,3 - epoxycyclopentyl) ether, and the diepoxides and polyepoxides described in U.S. Pats. Nos. 2,857,402; 2,884,408; 2,917,491 and 2,936,292 which are incorporated herein by reference. The advantages of the present invention are also obtained in epoxy systems containing any of the well known hardeners including the polyamines, polyamides, anhydrides of polycarboxylic acids, polyphenols, polyhydric alcohols, polycarboxylic acids and the like including those disclosed in the above-mentioned references.

The phosphorous acid-diesters of Formula I used according to the present invention as hardening accelerators are partially known and partially novel compounds. The compounds in which R and R' are the same are known; the compounds in which R and R' represent different radicals are novel.

Thus, the present invention relates also to new phosphorous acid-diesters of the general formula:

(II)

wherein R and R' are different and signify straight chain alkyl containing from 1 to 14 carbon atoms, branched alkyl of 3 to 14 carbon atoms, straight chain alkoxyalkyl groups having 2 to 14 carbon atoms, branched alkoxyalkyl having 3 to 14 carbon atoms, alkenyl and substituted alkenyl, aralkyl and alkaryl wherein the alkyl portions contain 1 to 9 carbon atoms and aryl, and wherein at least one of the substituents R and R' contain at least one chlorine and/or bromine atom.

The previously known phosphorous acid-diesters where in R and R' are the same can be produced according to a process given for this group of compounds, for example, in Houben-Weyl, Methods of Organic Chemistry, vol. 12, part 2, p. 20 ff.

A particularly effective method of production for the new phosphorous acid-diesters consists in reacting a phosphorous acid-monoester (RO)P(O)(H)OH with a phosphorous acid-triester (R'O)$_3$P at a mole ratio of 1:1. At the same time the triester (R'O)$_3$P introduces an ester radical into the monoester while forming the desired product (RO)(R'O)P(O)H and is itself converted into the diester (R'O)$_2$P(O)H, which can be distilled away. Effectively one would use as the triester the one of the two possible diesters (RO)$_2$P(O)H and (R'O)$_2$P(O)H which has the lower boiling point. The following is a specific example of this embodiment of the invention.

EXAMPLE 10

Seventy-two grams of mono-β-chloroethyl phosphite were heated in a 250 cc. three-necked flask to 50° to 70° C.; within 60 minutes 62 grams of trimethyl phosphite were added dropwise at this temperature. The mixture was then heated to 100° C. while stirring and was kept at this temperature for 4 hours. Subsequently the dimethyl phosphite which developed was distilled off at 2 torr via a 30 cm. Vigreux column. The distillation was maintained at a sump temperature of 124° C. and a head temperature of 85° C. The residue (61.1 g.) was methyl-β-chloroethyl phosphite with a phosphorous content of 19.55% (theory 19.58%) and a chlorine content of 22.39% (theory 22.55%). Refractive index: $n_D^{20}=1.4574$.

In an analogous manner the following new phosphorous acid-diesters were produced:

ethyl-β-chloroethyl phosphite
allyl-β-chloroethyl phosphite
phenyl-β-chloroethyl phosphite
p-nonylphenyl-β-bromoethyl phosphite
o-tolyl-β-bromoethyl phosphite The following four new compounds were produced according to Houben-Weyl loc. cit.:

bis-β-chloroethyl-α-dodecyl phosphite
bis-β-chloroethyl-α-butyl phosphite
bis-γ-chloropropyl phosphite
bis-β-chloro-β'-dodecyl-oxyisopropyl phosphite.

What is claimed is:

1. In an epoxy resin composition containing an epoxy resin having 2 or more 1,2-epoxy groups per molecule and a hardener for said resin, that improvement which comprises, including in said composition as hardening accelerator, from 0.1 to 150 parts by weight of a phosphorous acid-diester of the general formula:

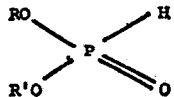

wherein R and R' are the same or different and signify a member selected the group consisting of straight chain alkyl containing from 1 to 14 carbon atoms, branched alkyl containing from 3 to 14 carbon atoms, straight chain alkoxyalkyl containing from 2 to 14 carbon atoms, branched alkoxyalkyl containing from 3 to 14 carbon atoms, alkenyl, aryl, and aralkyl and alkadyl wherein the alkyl portions contain from 1 to 9 carbon atoms, and wherein at least one of the substituents R and R' contains at least one halogen selected from the group consisting of chlorine, per 100 parts by weight of epoxy resin.

2. The epoxy resin composition of claim 1 wherein the hardener is selected from the group consisting of amines, polyamino amides, melamine resins, anhydrides of organic and inorganic acids, phenol resins, isocyanates, polyhydric alcohols and polycarboxylic acids.

3. The epoxy resin composition of claim 1 containing from 5 to 20 parts by weight of said phosphorous acid-diester.

4. The epoxy resin composition of claim 1 wherein said halogen is chlorine.

References Cited
UNITED STATES PATENTS

| | | | |
|---|---|---|---|
| 3,312,636 | 4/1967 | Rizzo | 260—2 Ep |
| 2,372,244 | 3/1945 | Adams et al. | |
| 3,270,096 | 8/1966 | Lanham et al. | |
| 3,310,503 | 3/1967 | Huwyler et al. | |

WILLIAM H. SHORT, Primary Examiner

T. E. PERTILLA, Assistant Examiner

U.S. Cl. X.R.

117—127, 155 R, 161 ZB; 161—185; 260—2 EC, 28, 33.6 Ep, 37 Ep, 47 EC, 77.5 R, 78.4 Ep, 831, 834, 967